United States Patent
Peters et al.

(10) Patent No.: US 6,993,865 B2
(45) Date of Patent: Feb. 7, 2006

(54) REINFORCED ROD HOLDER

(76) Inventors: Samuel Morgan Peters, 27 Magazine Ave., Savannah, GA (US) 31401; James Dewberry, 27 Magazine Ave., Savannah, GA (US) 31401

( * ) Notice: Subject to any disclaimer, the term of this patent is extended or adjusted under 35 U.S.C. 154(b) by 0 days.

(21) Appl. No.: 10/777,464

(22) Filed: Feb. 11, 2004

(65) Prior Publication Data

US 2005/0173610 A1    Aug. 11, 2005

(51) Int. Cl.
  *A01K 97/10*    (2006.01)
(52) U.S. Cl. ........................ 43/21.2; 248/514; 248/520
(58) Field of Classification Search ................ 248/511, 248/512, 514, 518, 534–540, 520; 43/21.2, 43/19.2, 23
See application file for complete search history.

(56) References Cited

U.S. PATENT DOCUMENTS

| | | | |
|---|---|---|---|
| 602,662 A * | 4/1898 | Miller ........................ 248/539 |
| 1,448,808 A | 3/1923 | McGowan | |
| 3,142,936 A | 8/1964 | Tweddell | |
| 3,902,269 A | 9/1975 | Dunlap | |
| 3,964,706 A * | 6/1976 | Adams ........................ 43/21.2 |
| 4,017,998 A | 4/1977 | Dumler | |
| 4,062,299 A | 12/1977 | Smith | |
| 4,235,409 A * | 11/1980 | Cummings ................... 248/538 |
| 4,375,731 A * | 3/1983 | Budd .......................... 43/21.2 |
| 4,485,579 A | 12/1984 | Hawie | |
| 4,551,939 A * | 11/1985 | Kitchens ..................... 43/21.2 |
| 4,578,891 A | 4/1986 | Murray | |
| 4,778,141 A | 10/1988 | Bogar | |
| 5,065,540 A * | 11/1991 | Potter, Jr. ................... 43/21.2 |
| 5,163,244 A * | 11/1992 | Rupp .......................... 43/21.2 |
| 5,322,254 A * | 6/1994 | Birkmeier ................ 248/231.9 |
| 6,643,974 B2 * | 11/2003 | Ruiz et al. ................... 43/21.2 |

* cited by examiner

*Primary Examiner*—Kimberly Wood
*Assistant Examiner*—Amy J. Sterling
(74) *Attorney, Agent, or Firm*—McHale & Slavin, P.A.

(57) ABSTRACT

A rod holder assembly formed from an upper flange member securable to receiving a socket mounted beneath a gunnel surface. The upper flange has concealed fastening bosses located beneath the flange member which are used to engage fastener that secure a backing plate that is coupled to the receiving socket. The backing plate can be attached directly to the lower surface of the gunnel wherein removal of the upper flange allows for refinishing of the mounting surface and/or the upper flange, without disturbing the receiving socket mounted position.

4 Claims, 3 Drawing Sheets

REINFORCED ROD HOLDER

FIELD OF THE INVENTION

This invention is related to fishing and in particular to improved rod holders for use in fishing boats.

BACKGROUND OF THE INVENTION

Conventional rod holders are well known for their functionality in holding most any style fishing rod as well as cutting tables, down riggers, shore power cords, boat hooks, gaffs, and so forth. Rod holders provide organization within the cockpit of a boat and are especially useful by providing a securing holding area when a boat is moving.

There have been many improvements to rod holders over the years. Examples of previously known forms of holders are disclosed in U.S. Pat. Nos. 1,448,808; 3,142,936; 3,902,816; 3,902,269; 3,964,706; 4,017,998; 4,062,299; 4,578,891, and 4,778,141. Most all known rod holders are secured to a transom of a boat by the use of fasteners that must engage the boat for securement. For instance, the most typically fastener is a wood screw which requires that the mounting service is structurally sound. The actual mounting service may be fiberglass, gel coat covered wood, plastic, aluminmum and so forth. In a typicaly wood based boat, the fastening screws must be sealed to prevent water intrusion that could allow the screw to back-out under pressure, or otherwise weaken the support.

Further, even if the fastening screws are properly sealed, the strength of the rod holder assembly is limited by the strength of the mounting surface. For instance, some production boats have a thin gunnel wall that is about ¼ in thickness and made of fiberglass. Should a large fish stike bait held on the end of a fishing rod, the rod and rod holder is at risk at being lost wherein a sharp pull could result in catastrophic failure of the fastener. In such instance, the use of a machine screw with enlarged washers may enhance the strength of the assmbly but is difficult to install and requires two people if the cockpit is lined.

Rod holders on more expensive boats may include a teak covering wherein the rod holder must be removed for periodic refinishing of the teak. Removal and subsequent installation can result in deformation of the screw heads and weakening of the support structure.

Thus, what is lacking in the art is a rod holder that has all fasteners concealed from the elements and can be used on thin or otherwise structurally inept mounting surfaces.

SUMMARY OF THE INVENTION

The fishing rod holder of the instant invention has an upper flange securable to receiving a socket mounted beneath the mounting surface by use of a backing plate. The backing plate is slotted for accommodating mounting surfaces ranging from ¼ inch in thickness to an excess of 2" inches in thickness, eliminating the need for any fastener to be exposed to the elements and enhancing the appearance of the rod holder.

Thus an objective of the instant invention is to incorporate a backing plate into a rod holder that allows for structural strength on most any type of mounting surface.

Still another objective of the instant invention is to include slots in a backing plate to allow for adjustment of the rod holder for use on mounting surfaces having various thicknesses.

Still another objective of the instant invention is to disclose a rod holder having an improved appearance by eliminating the use of any mounting mechanisms that can be viewed from the cockpit area.

Still another objective of the instant invention is to provide a rod holder wherein the receiving socket can be permanently attached to a mounting surface whereby the upper flange can be removed for cleaning or refinishing without disturbing the receiving socket.

Yet still another objective of the instant invention is to disclose fastenless mounting for adaptation to striking rod holders and rotatable butt holders.

Yet still another objective of the instant invention is disclose a rod holder that is simple to manufacture by eliminating the need for drilling and finishing of mounting holes.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION

Figure 1:
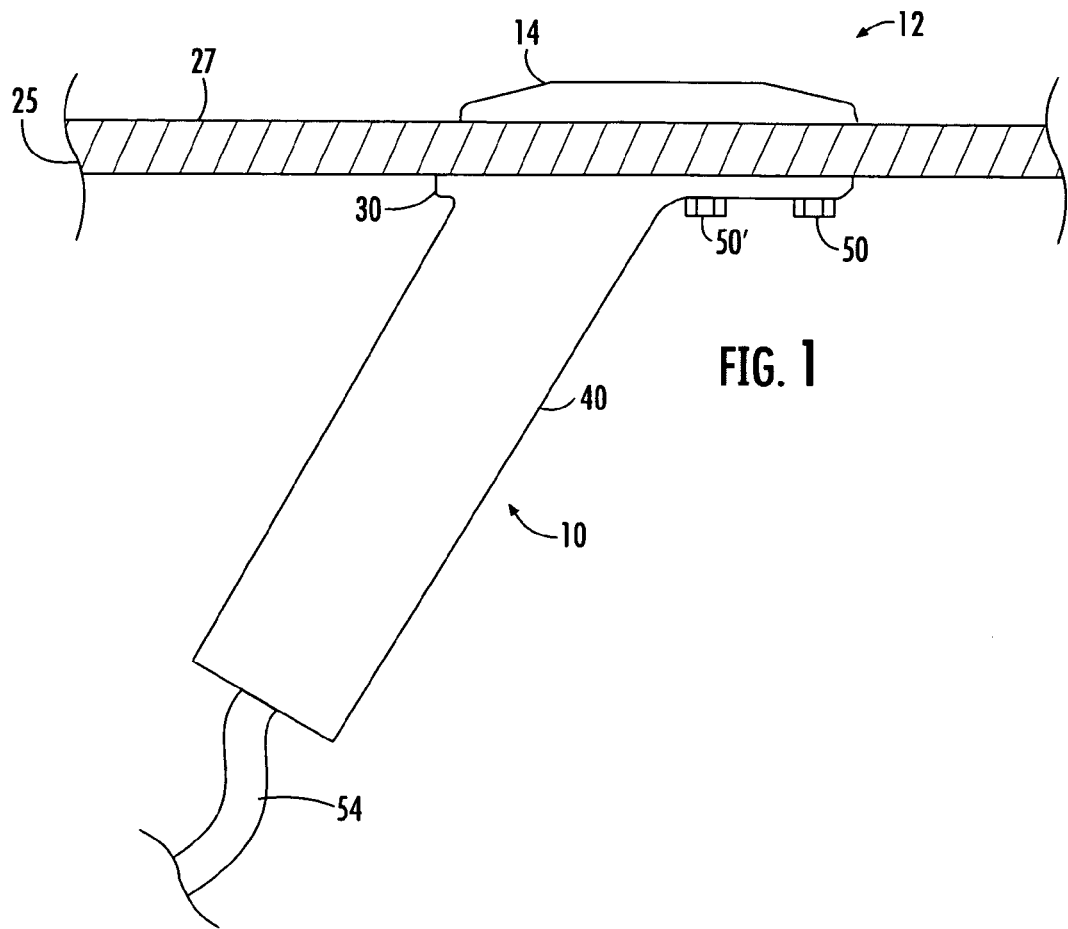
FIG. 1 is a side view of the rod holder assembly in a mounted position.
Figure 2:
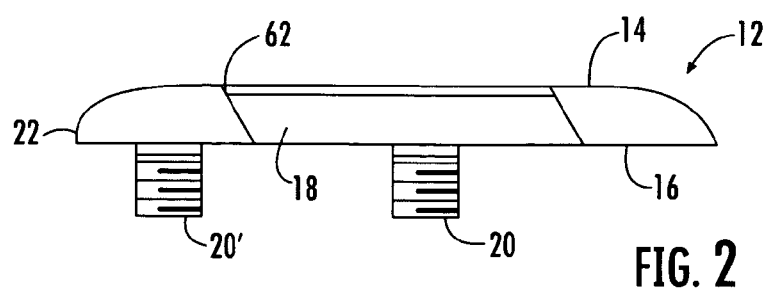
FIG. 2 is a side view of the upper flange member.

Although the invention will be described in terms of a specific embodiment, it will be readily apparent to those skilled in this art that various modifications, rearrangements and substitutions can be made without departing from the spirit of the invention. The scope of the invention is defined by the claims appended hereto. Referring now in general to the Figures, set forth is a rod holder assembly 10 of the instant invention having an upper flange 12 defined by a top surface 14 and a lower surface 16 with a centrally disposed aperture 18 therethrough. The upper flange 12 operates as a coupling point employing at least one securement boss 20, and preferably three securement bosses 20, 20' and 20", each having internal threads receptive to a mechanical fastener such as a threaded bolt or machine screw. The upper flange 12 is further defined by a perimeter edge 22 which is spaced apart from the opening 18 effectively providing a lip that engages the top of a mounting surface 25 and distributes stress over a large area.

The top surface 14 of the upper flange 12 shows no visible fasteners and can be highly polished. Unlike conventional rod holders having exposed fastener holes which are difficult to manufacture and require finishing, the instant invention has all fasteners located beneath the flange.

Figure 3:
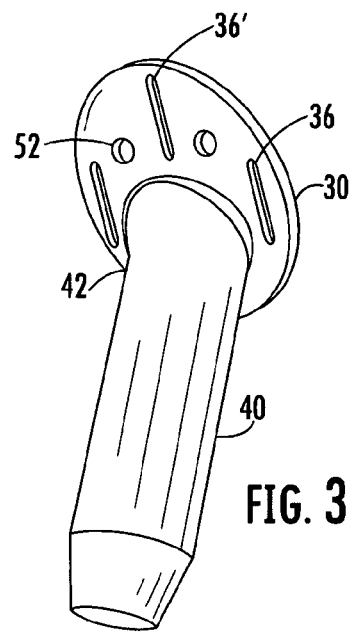
FIG. 3 is a front view of the receiving socket.
Figure 4:
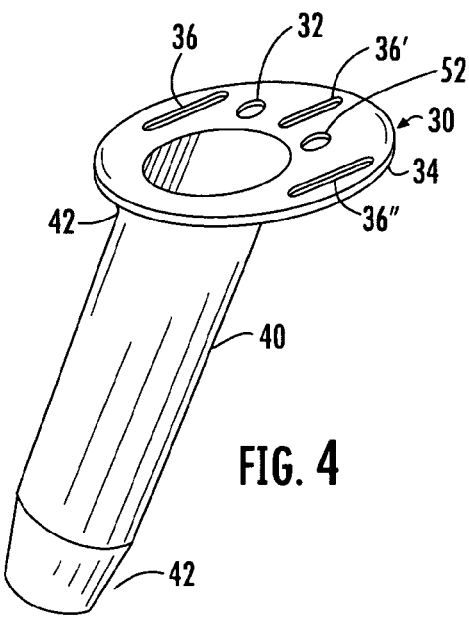
FIG. 4 is a perspective view of the receiving socket.

A backing plate 30, emphasized in FIGS. 3 and 4, includes a centrally disposed opening 32 which is aligned with the centrally disposed opening 18 of the upper flange. The backing plate 30 includes a perimeter edge 34 which approximates the perimeter edge spacing of the upper flange to provide equal opposing pressure plates. The backing plate 30 includes apertures 36 for use in the aligning of bosses 20 and allowing for various mounting surface thicknesses. In the preferred embodiment the backing plate 30 is coupled to the receiving socket 40 by a weldment wherein the items are integral. The receiving socket has an upper end 42 coupled to the backing plate 30 and a lower end 42 depending therefrom. The receiving socket is constructed and arranged to receive a fishing pole handle that is inserted through the opening of the upper flange, through the opening on the backing plate, and through the opening on the upper end of the receiving socket.

Referring to FIG. 4, the open end 32 of the receiving socket is the same as the open end of the backing plate 30 wherein the embodiment illustrated depicts the backing plate and receiving socket as a single piece item permanently adjoined through a weldment of the two components. It should be noted that the receiving socket and backing plate may also be formed from a single piece casting, or coupled together by a disengaging threaded coupling as an alternate embodiment. The receiving socket 40 and backing plate 30 is coupled to the upper flange 12 by use of fasteners 50 which pass through slotted apertures 36 into the upper flange bosses 20. The slotted apertures 36 are elongated to allow for a mounting surface 25 ranging from about a quarter of an inch in thickness to approximately two inches in thickness. The slots allow the receiving socket to be aligned with the opening of the upper flange, despite the mounting surface thickness, thereby providing for a rod holder having a universal attachment.

The backing plate 30 and the upper flange 12 distribute the load over a broad cross-section of the mounting member 25. Unlike conventional rod holders, securement to a mounting member 25 does not require an engagement directly to the mounting member. The upper flange and the lower flange are bolted together sandwiching the mounting member 25 therebetween.

Securement holes 52, clearly illustrated in FIGS. 3 and 4, allow for the permanent attachment of the backing plate and receiving socket to the lower surface of the mounting member 25 by a threaded screw. In use the backing plate and receiving socket may be installed in a permanent fashion allowing the fixed placement of a drain pipe 54. Should the upper surface 27 of the mounting member 25 need to be refinished or the upper flange 12 be removed for any reason, the upper flange can be removed without disturbing the position of the backing plate, receiving socket or drain pipe. The mounting holes placed in the mounting member, that is the gunnel, may have the exposed sidewall sealed as no fastener is threaded into the mounting member.

Figure 5:
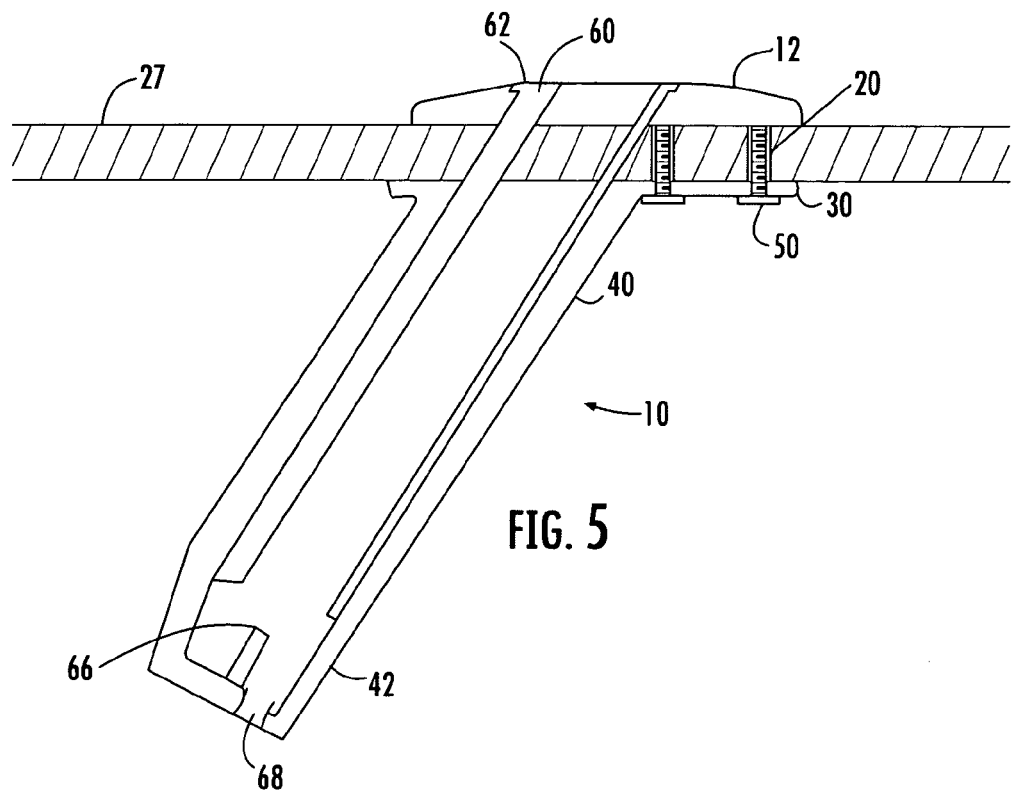
FIG. 5 is a cross sectional side view of the rod holder.

FIG. 5 provides a cross-sectional side view of rod holder assembly 10 having the upper flange 12 coupled to backing plate 30 and receiving socket 40. Fasteners 50 engage boss 20 of the upper flange 12. The cross-sectional view depicts a liner 60 that extends from the upper flange into the lower end 42 of the receiving socket. The liner 60 can be made of most any material, including the conventional materials such as vinyl or other plastic derivatives and is frictionally secured by an engagement lip 62 to the upper flange. Removal of the upper flange causes removal of the liner. The ability to remove the liner is simplified as the flange 12 operates as the holding tool, should the liner separate from the flange, the liner extends above the mounting member surface 27 making it easy to grasp without tools. The liner provides a continuous sidewall concealing the exposed gunnel section and preventing fishing rod handle marring during insertion and removal.

The receiving socket is preferably tubular shaped as disclosed, however it also may be elongated or frusto conical allowing the rod holder to be used in engaging a fish by quick movement without removal from the rod holder assembly. In the preferred embodiment the lower end 42 of the receiving socket includes a stop member 66 having a conventional shape for use in engaging the butt of a fishing rod handle. The handle butt for a conventional fishing rod includes slots for engaging the stop member to prevent rotation of the fishing pole. Further shown in FIG. 5 is the drain port 68 for use in draining rain water or ocean spray that enters the receiving socket which is preferably coupled to the aforementioned drain tube 54.

Figure 6:
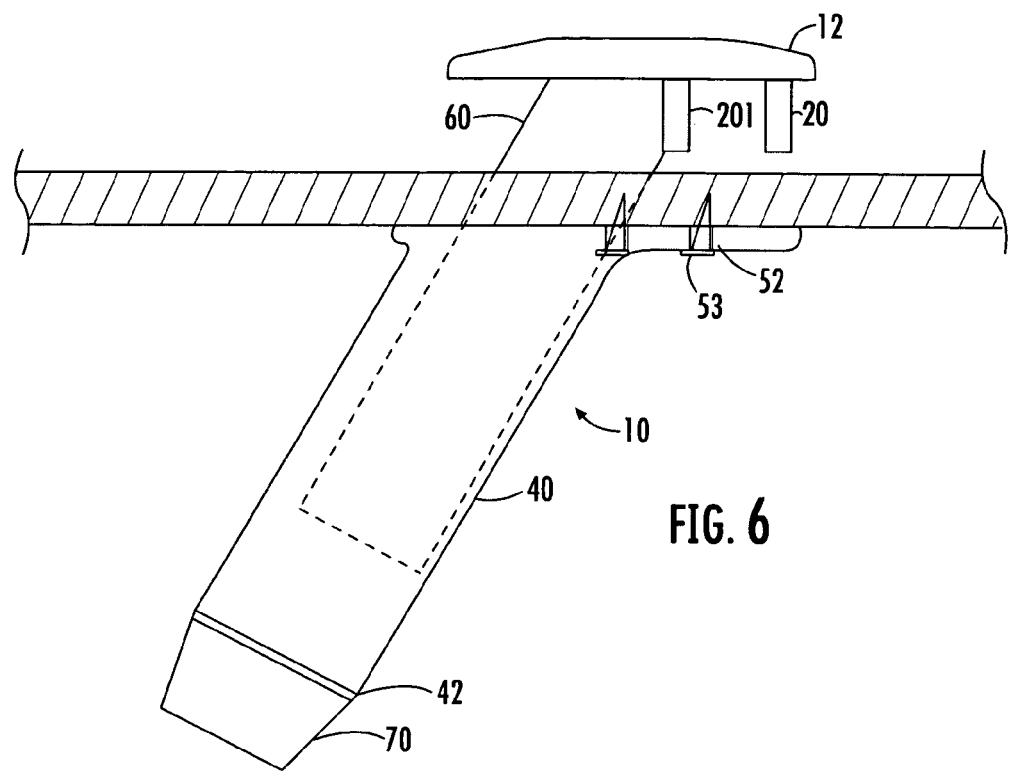
FIG. 6 is a partially exploded side view of the rod holder.
Figure 7:
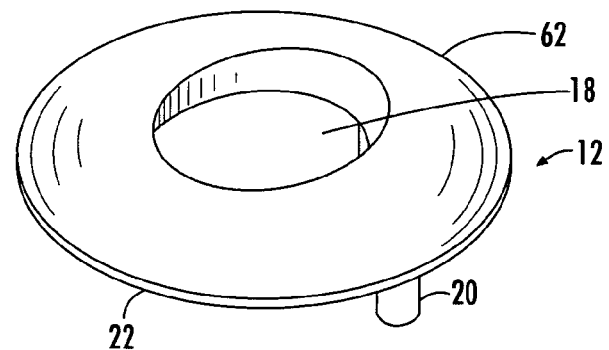
FIG. 7 is a perspective view of the upper flange member.

FIG. 6 illustrates the rod holder assembly 10 with the upper flange 12 partially removed together with liner 60. In this illustration, bosses 20 are disengaged from the fastening bolts, the mounting apertures 52 are engaged with mounting screw 53 to maintain engagement plate and receiving socket in a fixed position when the upper flange 12 has been disengaged. In this embodiment, a rotating butt is located along the lower end 42 of the receiving socket 40. Rotating butt stop members are known in the industry and are preferred by many fisherman to allow the fishing rod to rotate upon the strike of a large fish.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What is claimed is:

1. A rod holder assembly with concealed fasteners, said assembly comprising:

an upper flange having a top surface and a lower surface with a centrally disposed opening therethrough, said upper flange having a perimeter edge spaced apart from said opening;

a backing plate, said backing plate having a second centrally disposed opening;

a tubular shaped receiving socket having an open upper end formed integral to a backing plate and a lower end depending therefrom, said receiving socket securable to said upper flange and constructed and arranged to receive a fishing pole handle;

a stop member positioned in said lower end of said receiving socket for engaging the butt of a fishing rod handle;

a means for securing said backing plate to said upper flange; and a liner extending from said upper flange and extending into said receiving socket;

wherein said upper flange is positioned on top of a gunnel mounting surface and said backing plate is positioned beneath said mounting surface and fastened to said upper flange wherein said upper flange includes at least one fastener boss receptive to a fastener bolt inserted through a slotted aperture in said backing plate, said slotted apertures sized to accommodate mounting surface thickness from about ¼ inch to about 2 inches.

2. The rod holder according to claim 1 wherein said receiving socket has a continuous sidewall between said upper end and said lower end, said sidewall having an inner surface dimensioned to approximate said centrally disposed opening of said upper flange.

3. The rod holder according to claim 1 wherein said upper flange includes an engagement lip to frictionally engage an edge of said liner.

4. A rod holder assembly with concealed fasteners, said assembly comprising:
- an upper flange having a top surface and a lower surface with a centrally disposed opening therethrough, said upper flange having a perimeter edge spaced apart from said opening;
- a backing plate, said backing plate having a second centrally disposed opening;
- a tubular shaped receiving socket having an open upper end formed integral to a backing plate and a lower end depending therefrom, said receiving socket securable to said upper flange and constructed and arranged to receive a fishing pole handle;
- a stop member positioned in said lower end of said receiving socket for engaging the butt of a fishing rod handle;
- a fastener for securing said backing plate to said upper flange; and
- a liner extending from said upper flange and extending into said receiving socket;
- wherein said upper flange is positioned on top of a gunnel mounting surface and said backing plate is positioned beneath said mounting surface and fastened to said upper flange wherein said backing plate includes mounting apertures for securing said receiving socket to the lower surface of the gunnel, wherein removal of said fastener permits removal of said top flange without disturbing said receiving socket.

* * * * *